United States Patent [19]
Rohrberg

[11] 3,865,173
[45] Feb. 11, 1975

[54] THE ART OF CASTING METALS

[75] Inventor: Roderick Rohrberg, Torrance, Calif.

[73] Assignees: North American Rockwell Corporation; Air Products and Chemicals, Inc., both of Allentown, Pa. ; part interest to each

[22] Filed: Apr. 29, 1970

[21] Appl. No.: 43,643

Related U.S. Application Data

[60] Division of Ser. No. 830,565, May 8, 1969, Pat. No. 3,604,889, which is a continuation-in-part of Ser. No. 693,365, Dec. 16, 1967, abandoned.

[52] U.S. Cl. .................. 164/46, 164/52, 164/114, 164/289
[51] Int. Cl. ............................................ B22d 27/02
[58] Field of Search .......... 164/19, 46, 52, 66, 114, 164/251, 252, 259, 289; 219/121 P, 122

[56] References Cited
UNITED STATES PATENTS

| | | | |
|---|---|---|---|
| 1,638,336 | 8/1927 | Himes | 219/122 X |
| 2,125,080 | 7/1938 | Merrick | 164/252 X |
| 3,052,001 | 9/1962 | Brennan | 164/251 |
| 3,506,057 | 4/1970 | Pennock et al. | 164/19 |

FOREIGN PATENTS OR APPLICATIONS

| | | | |
|---|---|---|---|
| 816,565 | 5/1937 | France | 164/289 |

*Primary Examiner*—R. Spencer Annear
*Attorney, Agent, or Firm*—James C. Simmons; Barry Moyerman

[57] ABSTRACT

An inert gas welding torch is used to create plasma by directing one or more discrete high velocity jet gas streams into a welding arc between the electrode and the workpiece. The plasma stream is controllable with regard to energy content or location by varying the amount or direction of the inert gas flow. The plasma stream is insensitive to variations of arc length, and permits abnormally high current densities in the electrode. When used with consumable electrodes, the invention is useful for casting as well as for deep welding heavy plate materials in a single pass.

3 Claims, 28 Drawing Figures

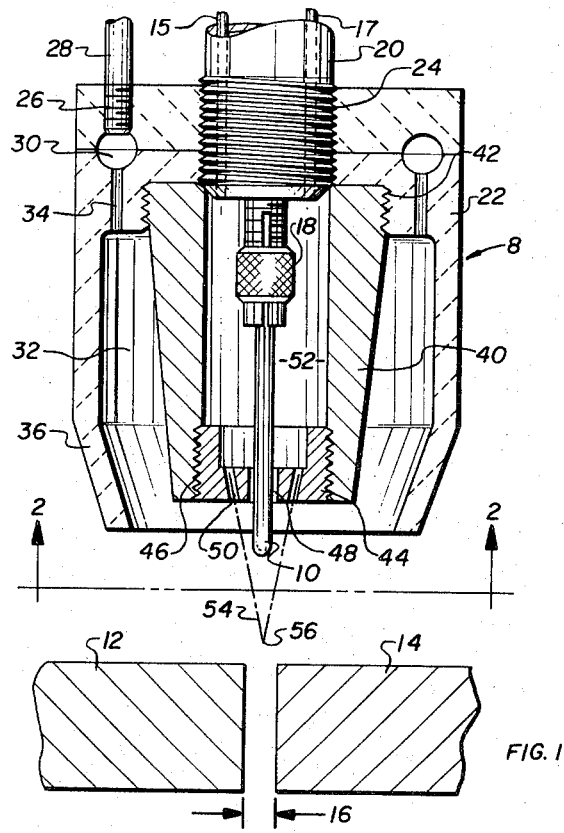
FIG. 1
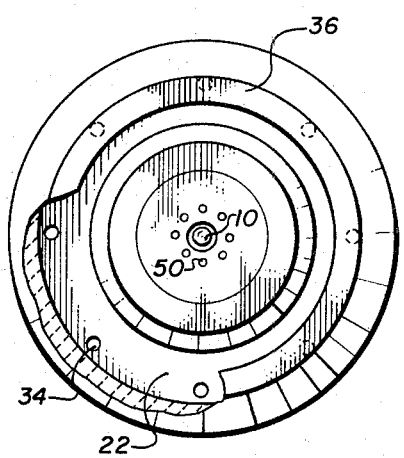
FIG. 2
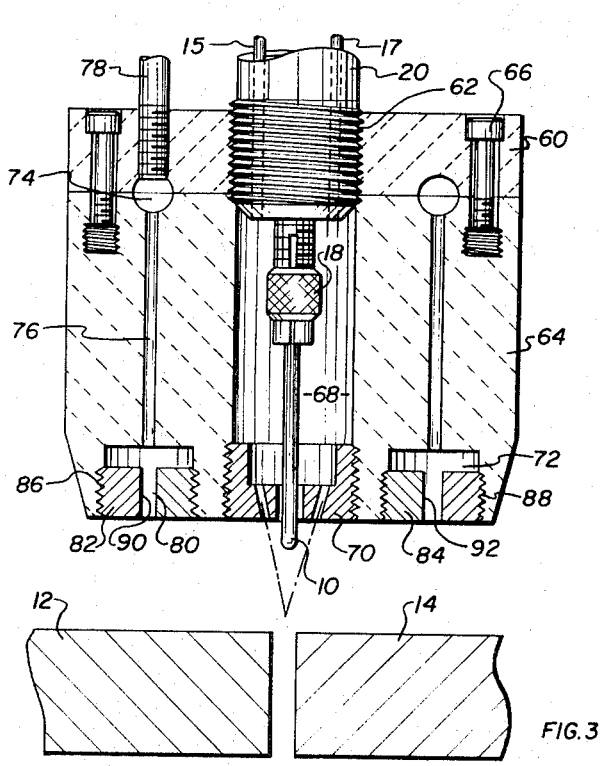
FIG. 3
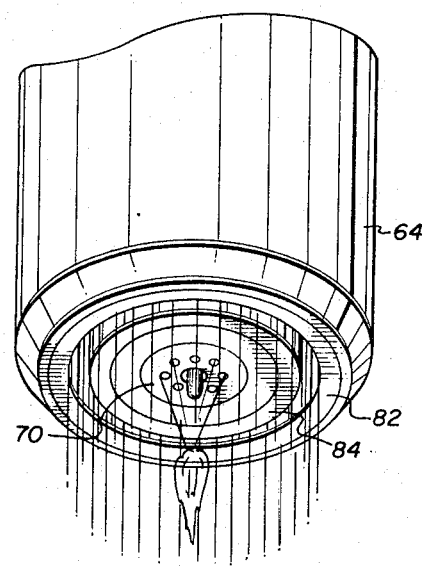
FIG. 4
INVENTOR.
RODERICK G. ROHRBERG
ATTORNEY

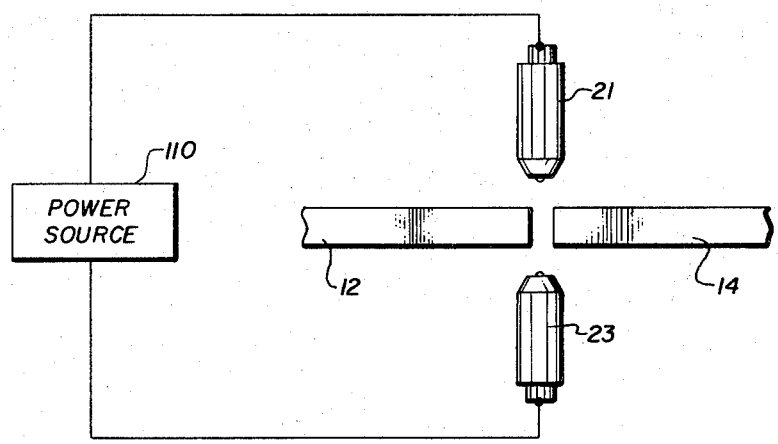
FIG. 7
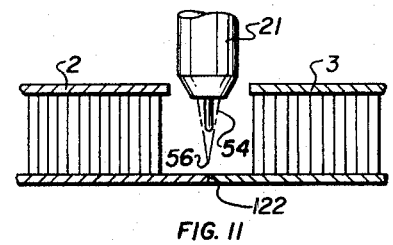
FIG. 11
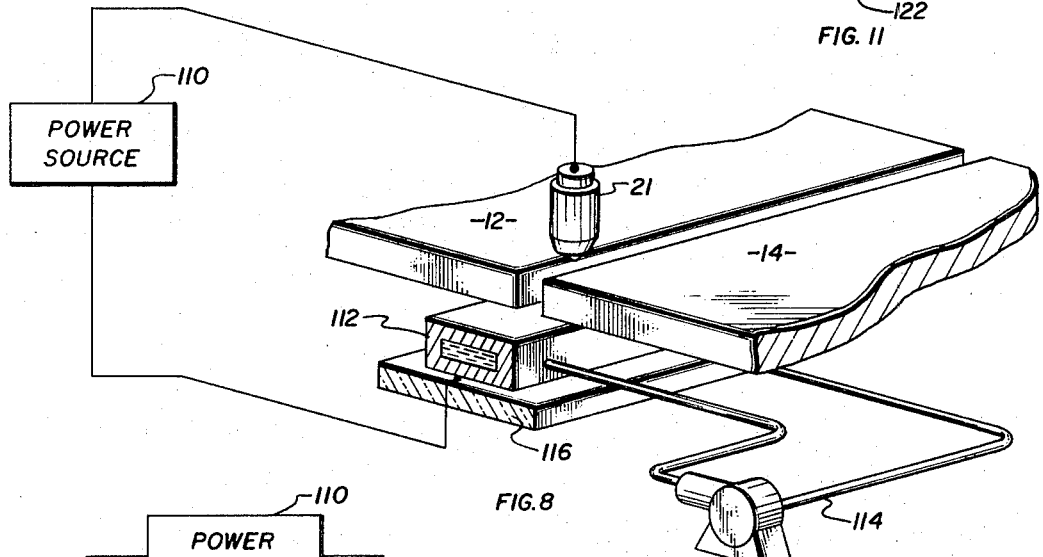
FIG. 8
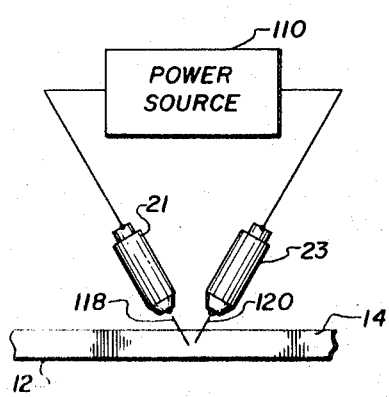
FIG. 9
INVENTOR.
RODERICK G. ROHRBERG
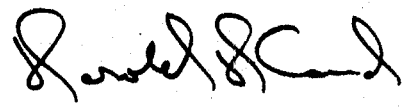
ATTORNEY

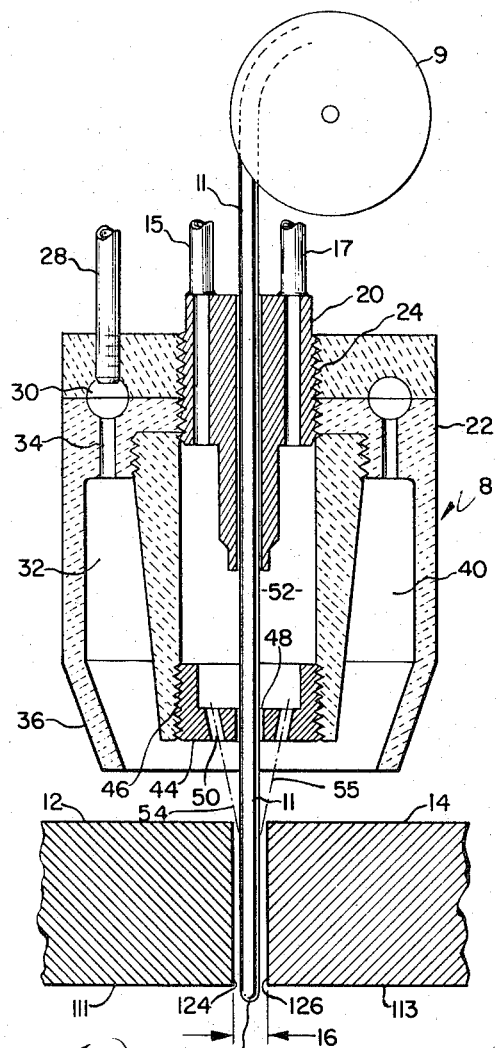
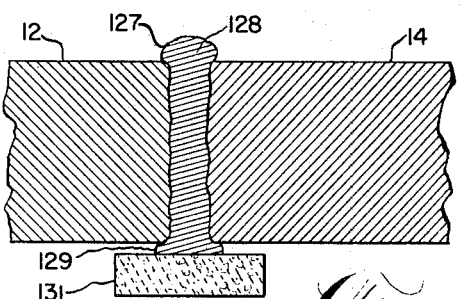
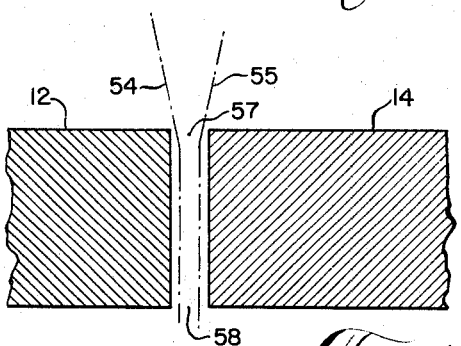
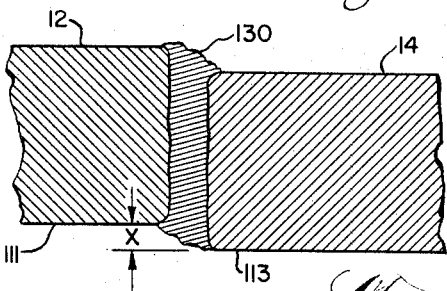
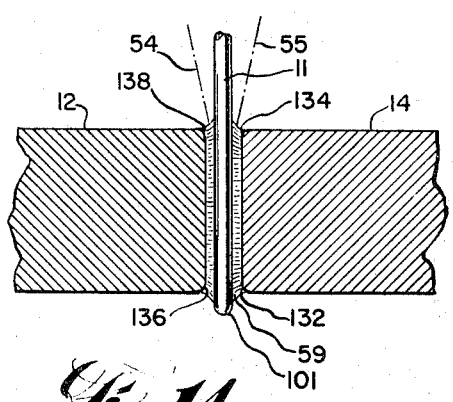
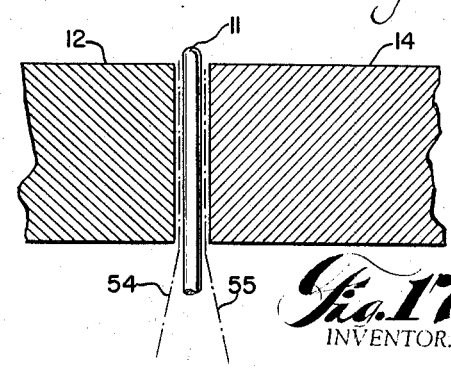
INVENTOR.
RODERICK G. ROHRBERG
ATTORNEY

INVENTOR.
RODERICK G. ROHRBERG

ATTORNEY

INVENTOR.
RODERICK G. ROHRBERG

ATTORNEY

THE ART OF CASTING METALS

This application is a division of copending application Ser. No. 830,565, filed May 8, 1969, now U.S. Pat. No. 3,604,889, which is a continuation-in-part of copending Application Ser. No. 693,365 filed Dec. 16, 1967 now abandoned.

BACKGROUND OF THE INVENTION

This invention includes and contemplates progressive fusion welding of metallic components along a predetermined path to form a permanent joint between the same. The invention is particularly pertinent to such joints having substantial depth, such as one quarter inch to one full inch of workpiece thickness, for example, and to joints normally requiring two or more successive passes of the electrode over all or some portion of the weld area to complete the joint using prior art methods.

The invention in this case combines certain features associated with conventional tungsten inert gas (TIG) as well as MIG (consumable electrode) welding and also with conventional plasma torch technology known to the prior art. Thus, TIG and MIG welding as currently practiced involve provision of a welding power source connected with an alectrode which is positioned close enough to a workpiece to produce a flow of current across the space or gap between the electrode and workpiece when the two are in circuit with the power source. A gas shroud surrounds the electrode and isolates the arc from surrounding atmosphere to minimize oxidation of molten metal in the weld puddle. The shape of the arc is essentially uncontrollable, and the inherent tendency of the current flow to pass through the electrode to the nearest workpiece portion necessitates care to prevent arcing at any place other than the electrode tip during deep welding within workpiece components having substantial thickness. Such uncontrolled arcing, as experienced in prior art methods, produces localized heating on one workpiece component without significant heating of the other such component as required to join the two together.

Plasma torches known to the prior art generally involve an elongate chamber such as a cylindrical body containing either a disc-type or a pencil-type cathode axially situated and spaced apart from a circular anode surrounding an exit opening. Inert gas supplied to the chamber is ionized by passage through the electrical arc established between the cathode and anode, exiting as a plasma stream through the stated exit opening. Electrode erosion, especially of the anode, is a commonplace problem in plasma torches widely known and used in industry. Such erosion is more rapid when the electrode is not effectively cooled, and such cooling is particularly difficult in plasma torches due to the extremely high temperature of the wholly contained arc within the chamber.

With further regard to background knowledge in the prior art, it has long been known that either an electric arc or a plasma stream may be altered in shape or location by directing external streams of shielding gas closely proximate such arc or stream. Typical of the issued U.S. patents relating to stabilization of an electric arc by surrounding the same with gas streams are the following: 1,638,336 issued Aug. 9, 1927; 2,554,236 issued May 22, 1951; 2,798,145 issued July 2, 1957; 3,238,349 issued Mar. 1, 1966; and 3,251,977 issued may 17, 1966. Issued U.S. patents involving or suggesting external gas shields to stabilize or otherwise shape a plasma stream include the following: 2,806,124 issued Sept. 10, 1957; 2,868,950 issued Jan. 13, 1959; 3,076,085 issued Jan. 29, 1963; 3,272,962 issued Sept. 13, 1966; and 3,349,215 issued Oct. 24, 1967.

SUMMARY OF THE INVENTION

The inventive concept in this case is particularly suited for converting standard inert gas welding torches into plasma torches. Although the plasma thus produced may be used for diverse purposes and in different ways, the inventive concept disclosed herein will be described in connection with fusion welding. Existing electrode mounts of standard well-known type used for TIG or MIG fusion weldidng torches may be easily modified to incorporate the teachings contained herein. Essentially, the changes required to convert such torches for plasma generation consist of providing one or more inert gas jet streams so oriented as to penetrate into an electrical arc beyond or proximate the electrode tip, as distinguished from gas flow in a direction parallel to the dominant direction of current flow in such arc, and drastically increasing both the current and gas flow rate above those associated with welding or with mere arc shielding and stabilizing as practiced in the prior art. Illustratively, a plurality of high velocity inert gas jet streams may be arranged symmetrically about the electrode and adapted to converge together at a focal point located on the longitudinal axis of the electrode.

The maximum current which can safely be applied to the electrode when used for conventional TIG or MIG welding may be roughly doubled when the same electrode is converted for use as a plasma generator. Moreover, no significant electrode erosion results from use of typical TIG welding electrodes, due to the cooling effect of the high inert gas flow rate directed into the arc. This aspect of the process disclosed herein is particularly important, since cooling problems are totally eliminated when the plasma-creating electrical arc is totally exposed and not confined within a chamber or other container as is the case with conventional plasma torches known to the prior art. Moreover, consumable electrode welding torches, when modified according to the novel teachings in this case, possess a particular versatility for applications requiring placement of molten metal in closely confined locations such as deeply within a welding gap between two confronting workpiece elements, or with corners or even within the center of a mold as discussed in detail below.

BRIEF DESCRIPTION OF THE DRAWINGS

FIG. 1 shows a cross-sectional view taken along the center longitudinal axis of a torch incorporating the inventive principles disclosed herein, FIG. 2 is a plan view of the structure shown in FIG. 1 looking in the direction indicated by arrows 2—2, with portions of structure omitted for the sake of clarity, FIG. 3 is a modification of the torch shown in FIGS. 1 and 2 and shown in cross-sectional view, FIG. 4 is a general perspective view of the structure shown in FIG. 3, FIG. 5 shows a modification of the electrode mounting arrangements of FIGS. 1 and 3, but adapted for reach-in welding at a location 90° away from the direction of reach-in.

FIGS. 7, 8, and 9 are further general schematic showings of different circuits which may be used with the various torches shown in the other figures.

FIG. 11 shows a "keyhole" type welded joint being made by a modified form of the device shown in FIG. 1, FIG. 12 shows a cross-sectional view corresponding generally with FIG. 1 of a modification adapting the novel structure for use with consumable electrode wire as associated with MIG welding, FIG. 13 shows a cross-sectional view through a welded joint accomplished by the apparatus and method suggested in FIG. 12, FIG. 14 shows the arcing characteristic between the electrode and workpiece of FIG. 12 during actual welding, FIG. 15 shows the gas flow pattern produced by the apparatus shown in FIG. 12 in relation to the same workpiece components, FIG. 16 shows a joint generally corresponding with the view shown in FIG. 13, but with the workpiece components misaligned horizontally, FIG. 17 shows the electrode and workpiece relationship corresponding with FIG. 12, but in an overhead welding position.

DESCRIPTION OF THE PREFERRED EMBODIMENTS

Figure 5:
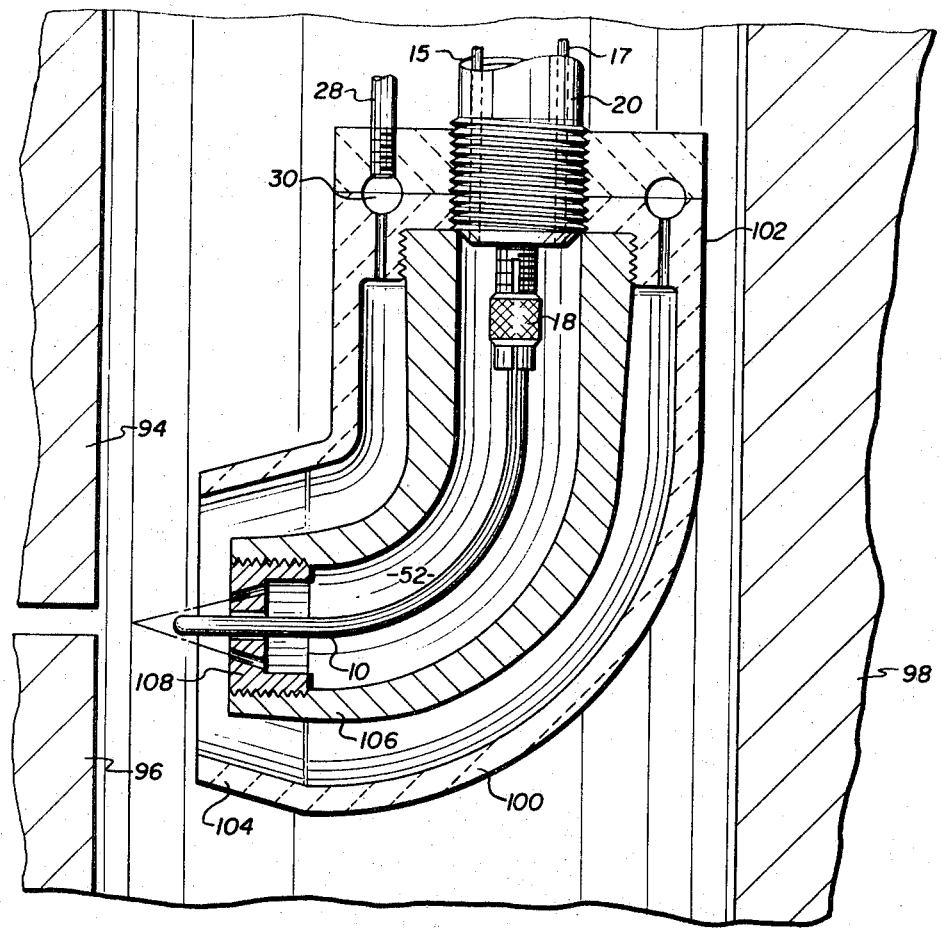

Referring to FIG. 1, torch 8 may be seen to include nonconsumable electrode 10 which is operatively related to workpiece components 12 and 14 for progressively joining the same along a path of travel generally aligned over gap 10 between the workpiece portions.

Electrode 10 is releasably secured within a bushing or collet assembly 18 supported in a holder 20 of any suitable type having electrical connection between electrode 10 and a source of welding power (not shown). The structures comprising elements 10, 18, and 20 are known in the prior art and may take various different forms now widely used in the welding field. Most such electrode mounts include suitable passage means for connection with a remote source of inert gas (not shown), and for flowing such gas around the electrode, as shown in FIG. 1 by passages 15 and 17 within holder 20.

A gas cup 22, which may also be of conventional design known to the prior art, is secured to holder 20 by appropriate means which may take the form of helical screw threads on both items 20 and 22 as shown by threads 24 in FIG. 1. Cup 22 is preferably of dielectric material such as ceramic, and functions to saturate the weld area with a suitable inert gas such as helium. For this purpose, cup 22 has connection means at inlet 26 for receiving a flow of inert gas from an external source (not shown) through line 28. Inlet 26 communicates with annular passage 30 which in turn communicates with area 32 within cup 22 through a plurality of spaced-apart passages 34, whereby a flow of gas from inlet 26 is substantially uniformly distributed circumferentially within area 32 and is downwardly directed as seen in FIG. 1 due to the confining influence of skirt portion 36 on cup 22.

As may be further seen from FIG. 1, a substantially closed chamber 40 of generally elongate shape surrounds a portion of electrode 10 and is supported within cup 22 by suitable means such as threaded connection suggested by threads 42. Chamber 40 is provided with an end closure portion 44 which functions as a nozzle and is secured to chamber 40 by suitable means which may illustratively take the form of threads 46 interengaged between chamber 40 and end closure element 44. Element 44 thus has the form of a substantially cylindrical insert, and is provided with a center hole 48 having a size slightly larger than the cross sectional size of electrode 10, thus resulting in a small gap between the electrode and the surface of hole 48 when the mentioned parts are assembled in the operative relationship shown in FIG. 1. Insert 44 is further provided with one or more holes or passages 50 radially spaced apart from hole 48 and orientated with respect to electrode 10 in a particular manner as described further below. Preferably, the stated passages 50 are at least four in number and are circumferentially situated about hole 48 and spaced apart from each other in a substantially uniform symmetrical pattern such as suggested in FIG. 2. It will be understood that, whereas eight passages 50 are shown in FIG. 2, that any number of passages larger or smaller than those shown can be made to serve the same purpose without departing from the inventive principles disclosed herein, and that the size and number of such passages will vary according to the size of nozzle element 44. Moreover, instead of a circular pattern, holes 50 may be arranged in other patterns either symmetrical or nonsymmetrical as desired to alter the directional characteristics of the plasma stream.

From the structure described above and shown in FIG. 1, it may be seen that chamber 40 within closure means 44, when assembled in operative relationship with holder 20 and the remaining structure thus disclosed forms a substantially enclosed area 52 which is adapted to function as a plenum chamber for inert gas supplied thereto through lines or passages 15 and 17 discussed hereinabove. When completely filled and pressurized by forceable entry of inert gas through lines 15 and 17, chamber area 52 provides no other exit for the gas contained therein than holes 48 and 50, whereby a plurality of high velocity gas jets or streams are formed by the stated apertures. Thus, as indicated by dotted lines 54 and 55 in FIG. 1, the conical slant of passages 50 relative to the long axis of electrode 10 causes high velocity inert gas jet streams to converge toward each other and to intersect their direction of flow at a point 56 which is situated within the location of the electrical arc normally produced by flow of current from electrode 10 to workpiece portions 12 and 14 when items 10, 12, and 14 are properly connected in a welding circuit.

As a result of the foregoing structural arrangement, the torch shown in FIG. 1 causes a significant portion of the high velocity gas exiting through passages 50 to be ionized upon penetrating the mentioned arc, whereby a plasma stream is produced substantially at the location of point 56 and to flow downwardly through gap 16. The velocity of the stated gas from passages 55 must be sufficient to penetrate, and preferably to pass through the stated arc, which normally exhibits a very high polarity. Inert gas supplied through line 28 and exiting from area 32 within cup 22 functions merely as a shroud to isolate the plasma stream from surrounding atmosphere. Thus, due to the extremely high velocity of gas jets 54, 55 and energy activity in the plasma stream thus produced during operation of the device shown in FIG. 1, a very strong jet pump or venturi action results in surrounding atmosphere becoming entrained in the gas and/or the plasma stream if an insulating shroud of inert gas from area 32 is not provided. Such entrainment of atmospheric gases would result in formation of metallic oxides and impurities at the location of any contact area between the plasma stream and the workpiece material. Gas exiting through gap 48 surrounding electrode 10 functions mainly to interfere with formation of a vortex at point 56 and does not appear to contribute significantly to the plasma flow produced by the arc. Also, it has a very useful cooling effect on electrode 10.

The modification shown in FIG. 3 includes means for preventing entrainment of surrounding atmosphere by the plasma stream created by electorde 10 when the surrounding atmosphere is characterized by high pressure disturbances such as wind gusts which might occur during field use of the welding device. Thus, electrode 10 and mounting elements 18 and 20 in FIG. 3 correspond with the same items shown in FIG. 1. However, cup 22 from FIG. 1 is replaced by two separate components which are operatively related to perform the functions of cup 22 and chamber 40 from FIG. 1 in a slightly different manner. Thus, a metallic disc-like housing support 60 is secured to holder 20 by suitable means which may illustratively comprise threads 62. Housing support 60 is in turn secured to housing member 64 by appropriate means such as a plurality of bolts 66 or the like which may be circumferentially spaced around the center axis of holder 20. Housing 64 may conveniently be of ceramic or other dielectric material to minimize the danger of accidental discharge between housing 64 and workpiece components 12 and 14. Housing 64 has an inner cavity 68 which functions as a plenum chamber in the same manner as area 52 within chamber 40 described hereinabove in connection with FIG. 1. Moreover, chamber 68 has an end closure member 70 in the form of a substantially cylindrical and threaded insert having a plurality of holes therein adapted to function in the same manner as insert 44 discussed in connection with FIG. 1. Housing 64 is further provided with an annular cavity 72 which is substantially concentric with the long axis of electrode 10 and which communicates with annular passage 74 through a plurality of separate passages 76. Annular cavity 72 is thus adapted to receive a supply of inert gas through inlet line 78 corresponding in function with line 28 described in connection with FIG. 1, and to surround the arc normally created between electrode 10 and workpiece components 12 and 14 with a curtain of the stated inert gas. Thus, gas within annular cavity 72 exists from the same through annular gap 80, the width of which may be varied by selection of different diameters of rings 82 and 84. Thus, annular cavity 72 is provided with helical threads 86 and 88 on its inner and outer concentric walls, the stated threads oppositely corresponding with internal threads on ring 84 and external threads on ring 82, respectively. The two stated rings are operatively related when assembled in the relationship shown by FIG. 3 whereby surface 90 on outer ring 82 is in confronting and spaced-apart relationship with surface 92 on inner ring 84, the surfaces 90 and 92 forming the outer and inner walls of gap 80, respectively. By varying the radial distance of surfaces 90 and 92 with respect to the long axis through electrode 10 using rings of different sizes in this respect, it will be understood that the width of shape of gap 80 may be adjustably varied to produce the mentioned shroud or curtain of gas flow. The configuration thus shown by FIG. 3 is particularly adapted for field use wherein wind gusts or other atmospheric disturbances which could displace or otherwise disrupt the protecting flow of gas from area 32 of cup 22 in FIG. 1 is effectively resisted by the higher velocity stream of inert gas which results from gap 80 in the torch of FIG. 3, and further suggested by FIG. 4.

A further modification of the device shown in FIG. 1 and particularly adapted for "reach-in" welding at relatively crowded or inaccessible workpiece areas may be seen in FIG. 5. Thus, reference numerals 94, 96, and 98 in FIG. 5 denote workpiece components structurally interrelated whereby welding is required to be done within a severely limited space envelope and in a difection 90 degrees from the direction in which a welding torch can be inserted from above in the view shown.

Electrode holder 20 and collet assembly 18, together with certain other related components, may be seen to correspond with the same structure shown in FIG. 1. However, cup 22 in FIG. 1 is replaced in FIG. 5 by cup 100 having a substantially 90 degree curvature between its upper end 102 and exit skirt portion 104. Also, chamber 40 seen in FIG. 1 is replaced in FIG. 5 by curved chamber 106 having substantially the same shape and curvature as cup 100. Insert 108 in FIG. 6 corresponds in shape and function with inserts 44 and 70 in FIGS. 1 and 3, respectively.

Figure 6:
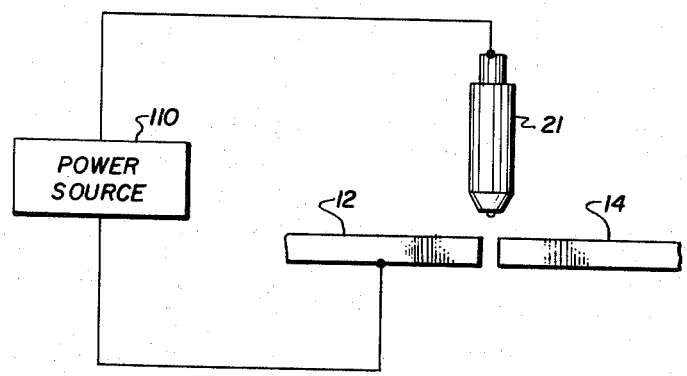
FIG. 6 is a schematic view of an elementary circuit usable with the torches shown in FIGS. 1-4 and 12.

FIGS. 6 through 9 schematically suggest various types of circuits which may be used with the torches shown in FIGS. 1 through 5. Thus, FIG. 6 shows a conventional type of welding circuit widely used and known in the prior art. Workpiece portion 12 or 14 is grounded or otherwise connected in circuit with power source 110 and torch 21 to create an arc as required for plasma generation.

FIG. 7 shows a circuit corresponding essentially with that taught in U.S. Pat. No. 3,319,043 issued May 9, 1967, wherein an arc is established between two electrodes in torches 21 and 23 which correspond either to the structures shown in FIG. 1 or FIG. 3.

FIG. 8 shows a circuit essentially like that shown in FIG. 7 except that hollow elongate electrode 112 in FIG. 8 remains stationary whereas lower torch 23 in FIG. 7 moves in unison with torch 21 in order to maintain substantial alignment between the two. Electrode 112 is cooled by appropriate means such as pump and water circulatory system 114, and is connected in series with power source 110 and movable torch 21 whereby an arc results between items 21 and 112 while workpiece components 12 and 14 are not in circuit or grounded. Suitable heat and electrically insulated support means is provided for stationary electrode 112 as indicated at 116 in FIG. 8.

The circuit shown in FIG. 9 is generally similar to that shown in FIG. 7, except that torches 21 and 23 are situated on the same side of workpiece components 12 and 14. An arc is struck between the two torches as required to generate the plasma but the direction of plasma flow is predominantly as indicated by dotted lines 118 and 120. In the arrangement shown by FIG. 9, the use of torches 21 and 23 for plasma welding does not require a gap between the workpiece components as discussed hereinabove in connection with gap 16 shown in FIG. 1.

From the details set forth above, it may be seen that the inventive concept in this case may be used to convert welding electrodes currently well-known and widely used into plasma torches. The basic principle of operation involves a drastic increase in the amount of applied current and the amount of inert gas above the amounts used during operation of the same device for welding. More importantly, the generation of plasma in the manner discussed hereinabove requires one or more powerful jets of inert gas oriented so as to cause the stated jet or jets to penetrate or otherwise intersect the welding arc rather than flowing parallel to the direction of welding current between electrode 10 and the workpiece. Thus, the direction of ionizing gas flow is angularly disposed relative to the direction of current flow at the location of the ionizing arc in all of the embodiments disclosed above.

The device disclosed hereinabove provides certain significant advantages resulting from the fact that the ionizing arc is not contained in a chamber or housing, but is completely external of the torch. Thus, the severe cooling problems associated with conventional plasma generating devices are totally absent in the torches disclosed herein. As a result, electrode erosion is not noticeably greater when torch 8, for example, shown in FIG. 1 is used as a plasma generator than when used for conventional TIG welding. The foregoing feature is particularly surprising when it is considered that much greater current may be applied when torch 8 is used to create plasma than when used for TIG welding. Thus, when electrode 10 in FIG. 1 is 0.090 inches diameter, the maximum current which could be safely applied to torch 8 when used for TIG welding has been found by actual test to be on the order of 200 amps, beyond which the electrode, which is normally non-consummable, would visibly disappear by reason of extremely rapid erosion. However, when electrodes of the stated diameter are used in torch 8 in the manner described above for plasma generation, a maximum current on the order of 400 amps may be safely applied without any noticeable erosion effects on electrode 10 resulting from such increase.

Figure 10:
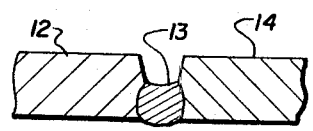
FIG. 10 shows a cross-sectional view through a partially welded joint using the torches disclosed in FIGS. 1-5.

It is of further particular significance in this case that the torches shown in FIGS. 1, 3 and 5 and discussed above are freely convertible from plasma welding to conventional TIG welding without interrupting the flow of current to electrode 10. This performance feature is of special usefulness in welding heavy-walled tubes or conduits such as in forming butt-welded joints between adjacent conduit ends. In such joints, a complete traverse of the electrode around the circumference of the conduit joint is made, and a small overlay weld is accomplished to insure completion of the joint. During the initial traverse of the electrode around two confronting conduit ends having a gap therebetween corresponding to gap 16 shown in FIG. 1, it will be understood that the gap permits passage of the plasma stream from torch 8 through the gap and in close proximity to the confronting surfaces forming the same. However, when a plasma stream from torch 8 is applied to a surface too thick for the plasma stream to burn completely through, and in the absence of a gap such as gap 16, the stream is impacted against the surface and laterally displaced in all directions whereby control of the energy thus applied for welding purposes is critically impaired. Accordingly, use of torch 8 of FIGS. 1 or 3 in the plasma generating mode permits deep welding to be done during the initial traverse of the torch around the heavy-walled conduit ends, as a result of which a weld bead is formed which closes the stated gap, after which any further welding passes by torch 8 will normally require operation of the torch in the conventional TIG welding mode. Thus, referring to FIG. 10, weld bead 13 is formed during the initial pass of electrode 10 when operating in the plasma generating mode to join workpiece portions 12 and 14. Additional welding passes as required to fill completely the gap between workpiece portions 12 and 14 will require operation of electrode 10 in the conventional TIG welding mode. Conversion from one mode to the other using torch 8, for example, shown in FIG. 1 involves merely a drastic reduction in flow rate of inert gas through apertures 48 and 50, accompanied by simultaneous reduction of current through electrode 10, such as from 400 amps to 100 amps or less. The conversion step, since it involves only the operating parameters and no structural changes, may be accomplished easily, automatically and rapidly.

Referring to FIG. 1, it is also a feature of torch 8 that the length of electrode 10 may be varied over a wide range such as to permit welding within keyhole joints of the type shown in U.S. Pat. No. 3,099,740 issued July 30, 1963, FIG. 2 of which is shown in modified form as FIG. 11 of the drawings herein. In FIG. 11, torch 21 has an electrode corresponding in all respects to electrode 10 in torch 8 of FIG. 1 except that it protrudes farther from the surrounding gas cup than electrode 10, for reaching between face sheets 2 and 3 on a lightweight panel "keyhold" type joint. The increase in length of electrode 10 protruding from cup 22 of torch 21 in FIG. 11 is accompanied by a change in the angularity of holes 50 around the electrode such as required to direct the streams of gas from holes 50 to a new point 56 beyond the distal or unsupported end of the electrode.

It should further be noticed that all of the torches disclosed herein, both in the plasma and the conventional welding mode, are adaptable for use with filler rod, consumable electrode or welding wire during the joining process. It will further be understood that the type of joint with which the torches disclosed herein may be used to accomplish a weld is not limited to butt joints or confronting spaced-apart surfaces such as those which form gap 16 in FIG. 1, but may comprise surfaces in close or coontinuous contact, lap joints, and others. Moreover, in the absence of gap 16, it will be understood that plasma generated by torch 8 in FIG. 1 is capable of cutting through many different workpiece materials provided the same have sufficient thinness to result in burnthrough by the plasma. Such burnthrough forms a small hole entirely through the workpiece material which moves progressively along the welding path in substantially continuous alignment with electrode 10, the base metal in the workpiece closing together behind such burnhole. In the presence of a gap such as gap 16, the molten material in workpiece components 12 and 14 flows together to form a weld bead such as bead 13 shown in FIG. 10, as the torch moves past any given point along the welding path. In the absence of the burnhole, such as when workpiece portions 12 and 14 are relatively thick, the provision of gap 16 is necessary to permit uniformity in the dominant direction of plasma flow generated by torch 8.

The structure and method discussed herein provide a much greater range of variation in plasma flow velocity than is permitted by plasma torches of conventional design known to the prior art. Thus, a relatively low velocity of inert gas through apertures 50 will result in a correspondingly lowered velocity of the plasma stream resulting during operation of torch 8 in the plasma mode. This results partially from the fact that the arcing does not depend upon a particular volume of inert gas being applied thereto, and is not extinguished by sudden change of inert gas velocity or rate through apertures 50. The arc continues as long as electrode 10 is positioned sufficiently close to workpiece components 12 of 14, or to another electrode as suggested in FIGS. 7 or 8, while electrical power is supplied thereto. When excessive energy is applied to the plasma srream, such as by increasing the flow of inert gas through apertures 50 in FIGS. 1 or 3, for example, the torches shown therein are very useful for metal cutting operations instead of welding, since molten metal is removed by the force of the plasma stream and the dwell time of the torch is increased above that associated with welding operation of the same torches. During welding operations, differences in arc length do not have such a critical effect on the amount of applied energy in the plasma stream as in conventional welding. Plasma flow will continue as long as the electrode is sufficiently close to the workpiece or to another electrode to maintain the arc.

With particular regard to the inventive concept disclosed herein as applied to MIG welding, a modification of the apparatus shown in FIG. 1 may be seen in FIG. 12, wherein tungsten electrode 10 of FIG. 1 is replaced by consumable electrode wire 11 in FIG. 12. Torch 8 in FIG. 12 corresponds very closely with the structure shown in FIG. 1, as noted by the similarity of reference numerals. However, holder 20 in the structure shown by FIG. 12 does not include collet means 18 but has a center hole therethrough adapted to make sliding contact with electrode wire 11 which is fed through holder 20 by suitable means (not shown) in a manner known to the prior art and including a reel 9. Notwithstanding the close similarity between the welding torch configuration represented between FIGS. 1 and 12, a very different relationship may be seen to exist between electrodes 10 and 11 with regard to the workpiece components 12 and 14 in each of the stated figures. Thus, electrode 11 is initially situated deeply within the weld zone whereby the distal tip 101 of the electrode may protrude slightly below the lower surfaces 111 and 113 of workpiece elements 12 and 14, respectively. Gap 16 between the stated workpiece components has sufficient width to admit the passage of ionizing gas omitted from exit openings 50 in the torch whereby virtually none of the stated gas flowing in the conical area defined by lines 54 and 55 in FIG. 12 is diverted laterally before entering gap 16. The foregoing relationship between the torch and the workpiece components is particularly shown in FIGS. 14 and 15, the latter illustrating a substantially cylindrical plasma column 57–58, while FIG. 14 shows that arcing occurs along the entire portion of electrode 11 situated within gap 16 as suggested by lines 59. It has been found that, where gap 16 is of insufficient width to admit gas column 57–58 initially, the gas forcibly penetrates the base metal and creates the necessary space gap 16 to accommodate column 57–58. As a result of the arcing shown in FIG. 14, electrode 11 is rapidly consumed and must be fed into the gap 16 from reel 9 at a relatively high rate during progressive fusion welding as torch 8 moves along the predetermined path defined by the gap. Moreover, it may be seen from FIG. 12 that workpiece elements 12 and 14 need no particular edge surface preparation prior to welding, and that confronting surfaces 124 and 126 of the workpiece portions 12 and 14 respectively, may terminate in substantially right angle relationship with the upper and lower surfaces of each workpiece element prior to welding. However, as a result of the arcing characteristic shown in FIG. 14, the stated angularity is altered whereby rounded corners 132, 134, 136, and 138 result due to erosion of base metal in the workpiece components during arcing. The weld seam resulting from the welding method thus shown in FIGS. 12, 14, and 15 may be seen in cross-section in FIG. 13 and is designated by reference numeral 128. Weld seam 128 has an enlarged width at each end thereof as shown by increased masses 127 and 129 in FIG. 13. During the foregoing welding operation, particularly during downhand welding in the position suggested by FIG. 12, for example, it is desirable to use a backup or chill bar 131 of ceramic or other non-metallic material to arrest or impede the flow of molten metal in weld seam 128. However, during overhead welding of workpieces 12 and 14 using the same apparatus and method suggested in FIG. 12, in the manner suggested by FIG. 17, for example, no such backup bar or mess is required, since gravity force naturally prevents excess growth of the weld bead at its upper end, while rapid movement of the arcing area along gap 16 causes weld bead 128 to cool before excessive drop-through occurs. Alternatively, a low velocity gas jet directed upwardly against the plasma column 57, 58 may be used in place of ceramic mass 131 to perform the same function. The forceful invasion of heat, gas and weld metal deeply within gap 16 results in complete penetration of the joint in a single pass.

The welding process thus suggested in FIGS. 12, 14, and 15 is particularly suitable in forming welded joints where the workpiece elements sought to be joined are not precisely formed or properly aligned. Thus, FIG. 16 shows weld bead 130 between workpiece components 12 and 14 which may be achieved even with such components misaligned horizontally as suggested by distance $x$ representing the measurement between lower surfaces 111 and 113 of components 12 and 14, respectively. Illustratively, welded joints such as suggested in FIG. 16 have been successfully achieved with plates 12 and 14 having a thickness of ⅜inch each and displaced horizontally a distance $x$ of 3/16 inch and a gap 16 of 1/16 inch, although the foregoing measurements do not represent limitations, and even greater misalignment could be possible.

Figure 18:
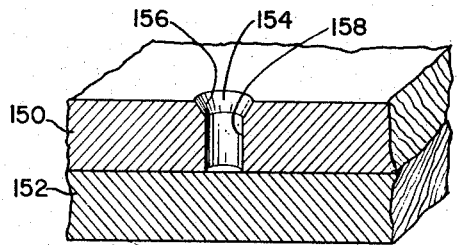
FIG. 18 shows a fragmented view, partly in cross-section and in perspective, of two workpieces adapted to be welded together using the apparatus shown in FIG. 12.
Figure 19:
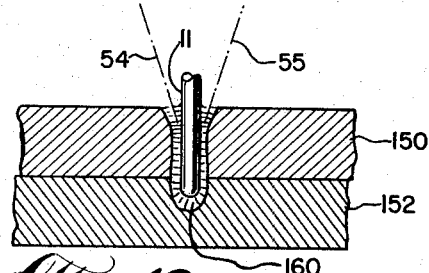
FIG. 19 shows the arcing characteristics of the electrode and workpiece shown in FIGS. 12 and 18, respectively.

The apparatus used in FIG. 12, for example, has been found to possess great versatility as a fabrication tool, useful in many different welding situations and processes in addition to other types of processes as discussed below. FIGS. 18 through 22 show two types of welded joints useful for securing together two plates or flange-like portions of metallic workpieces by one or more localized applications of welding heat to form a "welded rivet". In FIG. 18, workpiece element 150 is preplaced in contact or at least in close proximity with workpiece element 152 at the location where joinder therebetween is desired. Element 150 is provided with an aperture or opening 154 which may be generally cylindrical in form, although the precise shape of opening 154 is not critical. Moreover, opening 154 may be enlarged at one portion thereof, as suggested by generally conical surface 156 as distinguished from cylindrical portion 158 in FIG. 18, for a purpose discussed below. With the workpiece elements arranged as shown in FIG. 18, welding is accomplished by the apparatus shown in FIG. 12 by insertion of electrode 11 within opening 154 as shown in FIG. 19. Arcing between electrode 11 and workpiece components 150 and 152 simultaneous with gas flow suggested by lines 54 and 55 in FIG. 19 results in penetration of the arc and the electrode into element 152 by creation of a cavity 160. Where element 150 is non-metallic or non-weldable, arcing is limited to the space between electrode 11 and component 152, and will result in complete filling of hole 154 with weld metal because arcing continues as the weld puddle level rises within hole 154. The molten mass which results from melting of electrode 11 and base metal in elements 150 and/or 152 solidifies upon cooling to form a rivet-like mass 164 as seen from the cross-sectional view of FIG. 20. Mass 164 has an enlarged portion at its outer end due to the conical portion 156 of opening 154 initially formed in plate 150. Where no translational movement of electrode 11 occurs, mass 164 is of elongate and roughly cylindrical form such as a flathead nail and secures the workpiece elements together in fixed relationship in the general manner of a nail driven into two planks. Where hole 154 is an elongate gap to permit translational movement of electrode 11, mass 164 is a continuous weld seam instead of a localized, roughly cylindrical mass.

Figure 20:
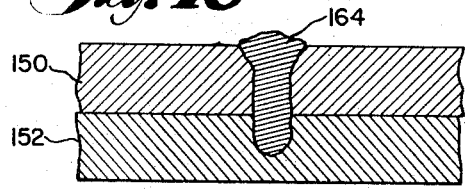
FIG. 20 shows the joint resulting from the welding apparatus and method suggested in FIGS. 12, 18, and 19.
Figure 21:
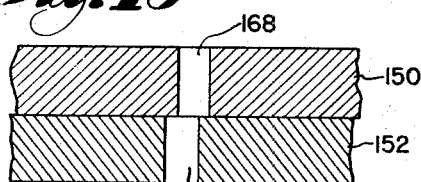
FIG. 21 shows two workpiece components adapted to be joined by the apparatus shown in FIG. 12.
Figure 22:
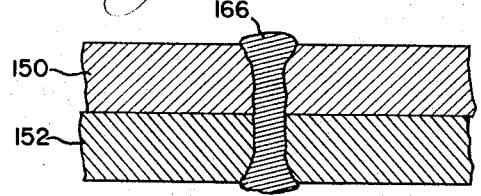
FIG. 22 shows the welded joint resulting from the apparatus and structure suggested in FIGS. 12 and 21.

FIG. 21 shows an alternative method for producing a weldment for the same purpose as that shown in FIG. 20, but with separate holes 168 and 169 formed in workpiece elements 150 and 152, respectively. It will be understood from FIG. 21 that holes 168 and 169 are roughly the same size and are formed in the workpiece elements before the welding operation is undertaken. Also, as suggested in FIG. 21, the holes need not be so carefully sized or located as to be in precisely coaxial matching relationship such as associated with rivet or bolt holes through two sheets or plates as practiced in the prior art. With plates 150 and 152 arranged as shown in FIG. 21, welding heat is applied to both elements by insertion of electrode 11 in the apparatus shown by FIG. 12 in the same general relationship as suggested between plates 12 and 14 in FIG. 12. The resulting weld nugget 166 shown in FIG. 22, upon solidification, secures workpiece elements 150 and 152 to each other in fixed relationship. The enlarged outer portions at each end of weldment 166 shown in FIG. 22 is a natural occurrence and serves to strengthen the holding force of the weldment in the same manner as the two upset ends of a rivet, for example. The weldments discussed above in connection with FIGS. 18 through 22 are characterized by improved simplicity, rapidity, and economy over conventional mechanical holding means and are useful in a wide variety of different applications, especially fluid tanks since they are self-sealing. Shrinking of the symmetrical nugget 166 results in residual compressive force being continuously applied to hold the workpiece elements firmly together.

Figure 23:
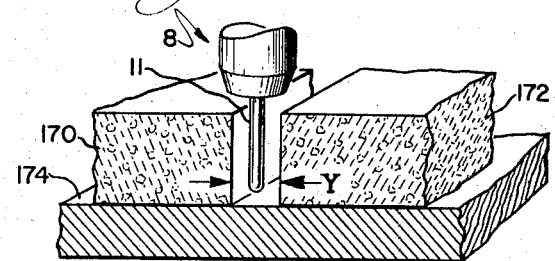
FIG. 23 shows the general relationship between the apparatus shown in FIG. 12 for in--place casting of metal on a workpiece.
Figure 24:
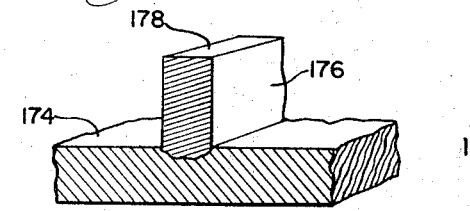
FIG. 24 shows the cast metal formed on a workpiece using the apparatus and method suggested in FIGS. 12 and 23, respectively.

Referring to FIG. 23, the apparatus shown in FIG. 12 may be used for casting molten metal in addition to its use for welding operations. Illustratively, containing means in the form of ceramic die blocks 170 and 172 are preplaced on the surface of a workpiece such as metallic plate 174. Workface surfaces 173 and 175 of blocks 170 and 172, respectively, are spaced apart a distance $y$ to provide a gap within which molten metal may be confined and formed. Operation of torch 8 with electrode 11 positioned generally as shown in FIG. 23 results in a deposit of molten metal as the electrode is consumed by the arc which is established between the electrode tip and workpiece 174. During torch operation, the torch may be moved along a path of travel coinciding generally with the planview shape of the gap between blocks 170 and 172, whereby progressive casting in place of molten metal occurs. After cooling and consequent solidification of the metal thus deposited, blocks 170 and 172 are removed, leaving the cast structure as suggested in FIG. 24 showing upstanding flange 176 integrally joined to workpiece 174. The distal edge 178 of flange 176 may be ground flat as shown or otherwise shaped by subsequent machining operations where desired.

Figure 25:
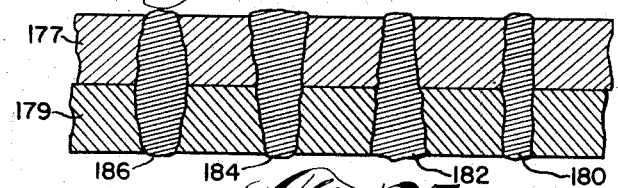
FIG. 25 shows variations of the cross-sectional shape of various weld seams produced by the apparatus shown in FIG. 12 using different operational parameters.

FIG. 25 shows four different weld nugget cross-sectional shapes achieved by varying the operating parameters during use of torch 8 shown in FIG. 12 to form weldments between workpiece elements 177 and 179. Weld seam 180 may be seen to have substantially uniform width and results from optimum welding conditions wherein the welding wire feed rate of electrode 11 is properly balanced with regard to voltage level and flow rate of gas streams 54 and 55 during welding in the general manner suggested by FIG. 12. Weld seam 182 shows the nugget cross-sectional shape resulting from use of higher feed rate of electrode 11 than that used for welding seam 180, but without a commensurate increase in welding voltage. Weld seam 184 shows the characteristic cross-sectional shape of the nugget resulting from decrease of wire feed rate of electrode 11 below that used during welding of seam 180 but without a commensurate lowering of welding voltage. Weld seam 186 is symmetrical about a horizontal axis through the center thereof, but is wider at the midportion than at the two outermost ends thereof, and is achieved by increasing the flow rate of the gas streams from nozzle exit openings 50 in the torch shown by FIG. 12, without a commensurate increase of voltage or wire feed rate above those used in welding seam 180.

Figure 26:
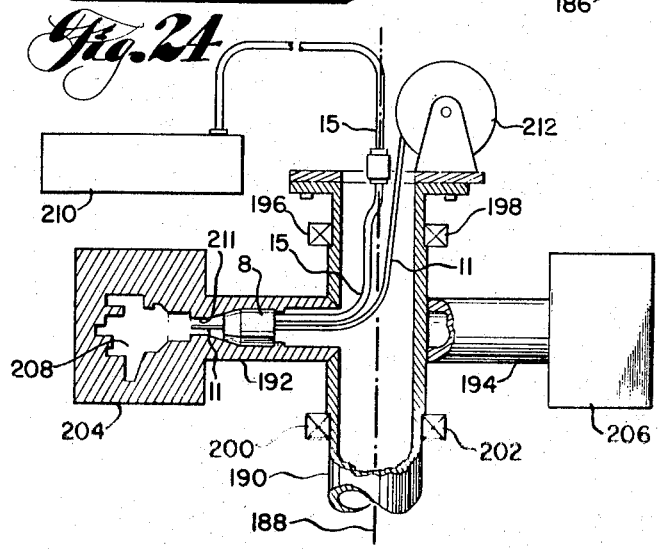
FIG. 26 shows a schematic view of apparatus adapted for centrifugal casting of workpieces using the structure shown in FIG. 12.

FIG. 26 shows a schematic view of apparatus such as may be used for centrifugal casting and incorporating torch 8 as shown in FIG. 12. The apparatus consists essentially of a rotor 190 having at least two radial arms 192 and 194 extending in opposite directions from rotor hub 190. Hub 190 and the elements secured thereto are adapted for rotation about a center axis 188 by appropriate means such as bearings 196, 198, 200, and 202 supporting the stated hub. A hollow die block 204 is mounted on arm 192, while a counterbalance weight 206 is supported on arm 194 to equalize the forces applied to rotor 190 during rotation thereof. Die block 204 contains a cavity 208 having a shape corresponding to the desired shape of the workpiece formed within the stated cavity. Torch 8 is supported within arm 192 and suitably connected with a power source (not shown) for establishing an arc between an electrode 11 and inlet 211 of hollow die block 204. Plasma gas source 210 and rotatable reel 212 are supported on rotor 190 as required to supply the operational requirements of torch 8 substantially in the manner suggested for the apparatus shown in FIG. 12. From the structure discussed above and shown in FIG. 26, it will be understood that operation of torch 8 produces molten metal at inlet 211 due to the melting of electrode 11 which is continuously fed into the mentioned arc, and that simultaneous rotation of rotor 190 together with components secured thereto results in centrifugal force whereby the stated molten metal is forcibly directed into cavity 208 to fill the same. Elaborate heating measures and the clogging of lines such as associated with centrifugal casting methods known to the prior art are avoided in the structure suggested by FIG. 26, since molten metal is created precisely at the inlet of the die cavity adapted to receive the same, and only as much welding wire need be consumed as is required to fill the die cavity, hence eliminating wastage or overflow of casting metal of course, one skilled in the art would provide a vent hole (not shown) that communicates with the mold so that the gases, after they become neutralized, may be exhausted out of the vent hole. The same advantages may be seen to result from operation of the apparatus shown in FIG. 27.

Figure 27:
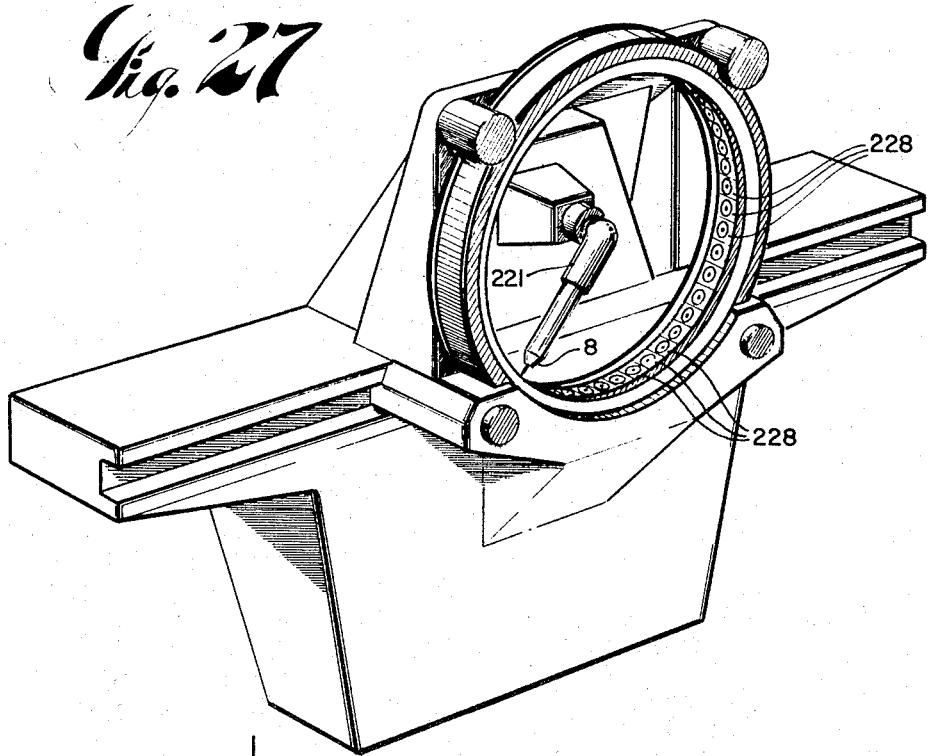
FIG. 27 shows a general perspective view of another modification involving use of the apparatus shown in FIG. 12 for casting instead of welding.

FIG. 27 is a general perspective view of apparatus incorporating torch 8 of the same structural configuration as shown in FIG. 12 for use in casting. The torch is secured on a rotatable arm 221 and connected by suitable means to a source of ionizable gas and a welding wire feed system. A multitude of individual casting dies 228 are arranged in a circle with inlet openings radially directed toward the exit of torch 8 and closely proximate thereto. Hollow cavities within dies 228 are filled individually and in progression by operation of torch 8 during simultaneous rotation of arm 221.

Figure 28:
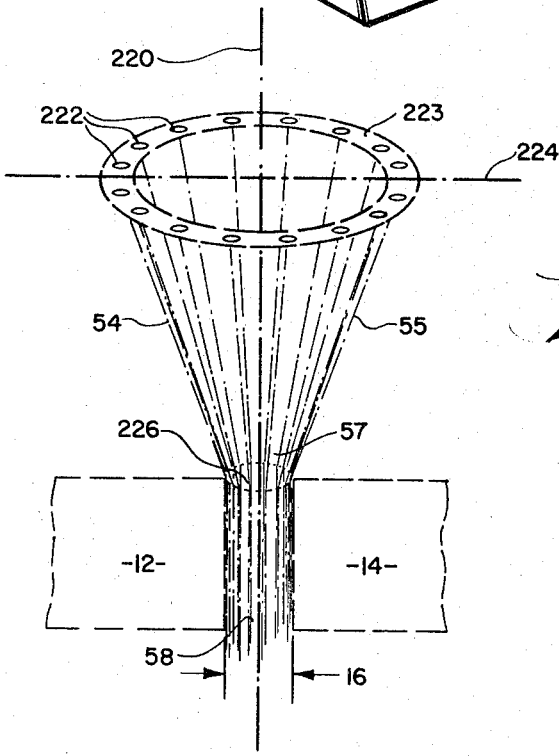
FIG. 28 is a perspective view in broken lines showing the gas flow pattern resulting from the operation of the structure in FIG. 12 in relation to the workpiece components shown in the same figure.

FIG. 28 shows a general perspective view of the gas flow pattern resulting from operation of the torches shown in FIGS. 1 and 12, for example, during downhand welding in the manner suggested particularly in the latter figure. Passages 50 in torch 8 of FIGS. 1 and 12 define a circle about a vertical center axis 220 shown in FIG. 28, the diametrical axis being designated 224. Lines 54 and 55 of FIG. 28 designate two diametrically opposite gas streams from two of passages 50 in the torch nozzle surrounding electrode 11 which is concentric about axis 220. All of the gas streams from passages 50 converge toward axis 220 to form a circular pattern 226 having a diameter substantially equal to gap 16 between workpiece elements 12 and 14. Upon entering gap 16, the gas flow pattern remains substantially uniform in width as suggested by cylindrical area portions 57 and 56 at each end of gap 16. The foregoing flow pattern results principally from the confining influence of workpiece elements 12 and 14 between which the gas or plasma stream flows during welding operations with torch 8. The amount, direction, and velocity of gas flowing from passages 50 are particularly significant in achieving the amazing results and advantages of the inventive concept disclosed herein. Thus, the total area 222 of the individual gas streams exiting through passages 50 and forming the conical pattern between circles 223 and 226 must be substantially equal to the net cross-sectional area of the stream passing through gap 16. Any excess of such area in the conical portion of the flow pattern shown in FIG. 28 compared with the area of the cylindrical portion in such pattern will result in lateral spillage of gas impacting the workpiece elements, such spilled gas being directed away from gap 16. Ideally, substantially all gas exiting from passages 50 should ultimately pass through gap 16, it being understood that the cross-sectional area of electrode 11 is necessarily subtracted from the total area of circle 226 to find the net flow area of the stream portions 57 and 58.

It will be understood that different gas flow rates, pressures, voltages, gas exit sizes, electrode sizes and other operating parameters may be used in practicing the inventive concept disclosed and claimed herein, while still maintaining the precise relationship between gas flow characteristics discussed above. Accordingly, no particular operating conditions should be regarded as critical in implementing the teachings contained herein. However, referring to FIG. 12, for example, carbon steel plates of ASTME grade 1035 having a thickness of ⅜ inch and a gap 16 of 0.025 inch have been welded without any edge preparation in the manner suggested by FIG. 12 using about 38 volts and a gas flow through chamber 52 of about 50 cubic feet per hour of helium. Apertures 50 in the foregoing instance had an area of 0.0016 square inch each and were eight in number, for a total of 0.0128 square inch area. Electrode wire 11 had a diameter of 0.062 inch and center aperture 48 had a diameter of 0.081 inch. The included angle between diametrically opposite holes 50 defined by the center lines thereof as suggested by lines 54 and 55 in FIGS. 12, 15, and 17, for example, was approximately 18 degrees, although a variation from 16 to 20 degrees for the mentioned angle has been found to provide acceptable results. The wire feed rate of electrode 11 during the mentioned welding operation was 500 inches per minute. The foregoing operating conditions produced a weld having the general form suggested by seam 180 shown, for example, in FIG. 25.

I claim:

1. A method for precision casting molten metal using a die block with an opening to receive molten metal, said method comprising:

positioning an elongated consumable metallic electrode adjacent said opening, said electrode being made of said metal, forming an electric arc between said electrode and said die block so that said electrode melts to produce said molten metal, directing a stream of ionizable gas towards said arc and said opening with sufficient force to penetrate said arc and to cause said molten metal to form a stream and enter said opening so that said molten metal solidifies within said die block, and feeding said electrode into the arc to maintain the arc until said die block is filled with metal.

2. The method of claim 1 further includes the step of moving said electrode and said die block in a circle so that centrifugal force accelerates the molten metal into said die block to form a dense compact casting.

3. The method of claim 1 further includes the steps of:

providing a plurality of die blocks arranged in a circle with their respective openings facing the center, and moving said electrode in a circle as the arc is formed so that molten metal enters each die block in turn.

* * * * *